Figure 1:
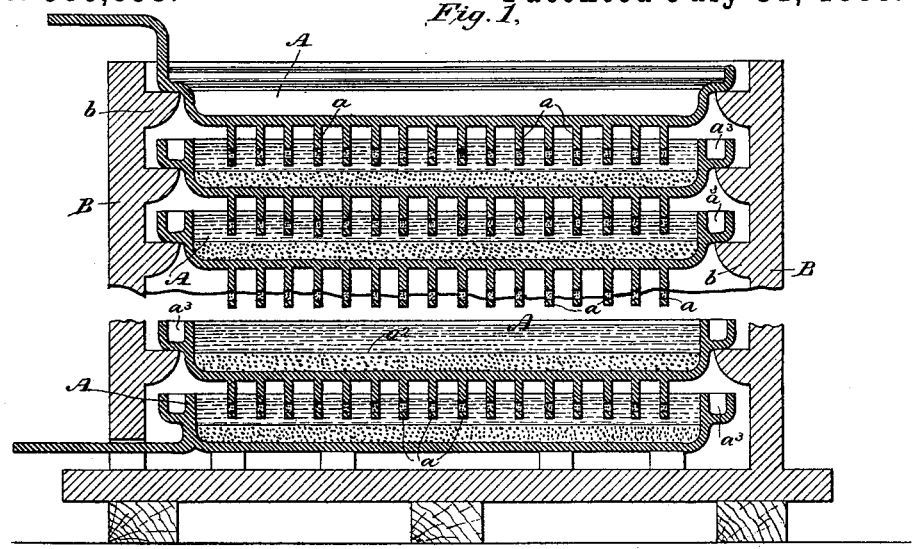

(No Model.) 2 Sheets—Sheet 1.

J. S. SELLON.
SECONDARY BATTERY.

No. 386,898. Patented July 31, 1888.

Witnesses.
W. H. Lowrie
H. R. Parish

Inventor,
John S. Sellon
By his Attorney Wm. B. Vansize (No Model.) 2 Sheets—Sheet 2.
J. S. SELLON.
SECONDARY BATTERY.
No. 386,898. Patented July 31, 1888.
*Fig. 3,*
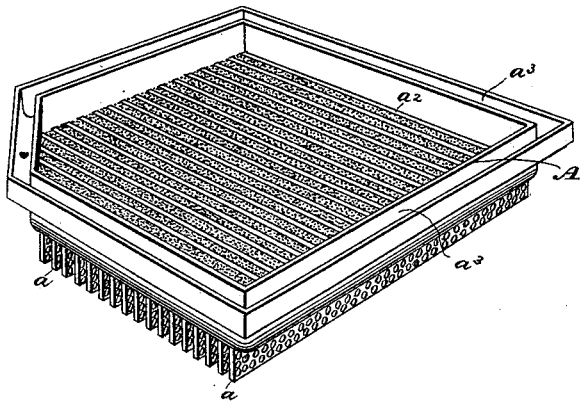
*Fig. 5,*
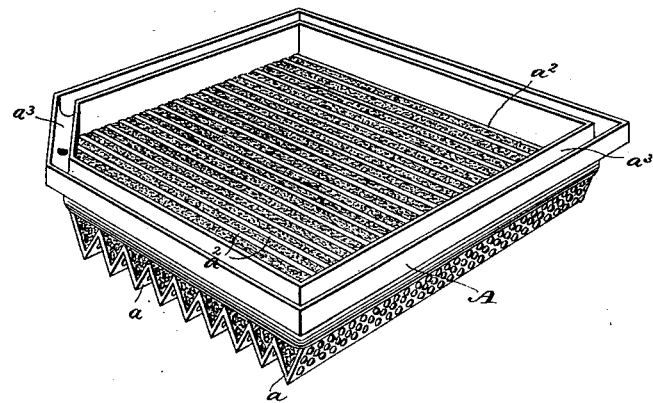
Witnesses,
M. H. Shounds.
H. R. Panish.
Inventor,
John S. Sellon.
By his Attorney Wm. B. Vansize,

UNITED STATES PATENT OFFICE.

JOHN S. SELLON, OF THE HALL, SYDENHAM, COUNTY OF KENT, ENGLAND, ASSIGNOR TO THE ELECTRICAL ACCUMULATOR COMPANY, OF NEW YORK.

SECONDARY BATTERY.

SPECIFICATION forming part of Letters Patent No. 386,898, dated July 31, 1888.

Application filed September 28, 1887. Serial No. 250,891. (No model.) Patented in England November 10, 1886, No. 14,563.

*To all whom it may concern:*

Be it known that I, JOHN SCUDAMORE SELLON, gentleman, a subject of the Queen of Great Britain and Ireland, and residing at The Hall, Sydenham, in the county of Kent, England, have invented certain new and useful Improvements in Secondary Batteries, (for which I have obtained Letters Patent in Great Britain, No. 14,563, dated November 10, 1886,) of which the following is a specification.

My invention relates to secondary batteries or electrical accumulators, and has reference to the employment of vessels in the form of trays, flat dishes, troughs, or shallow tanks of lead, which may be of any convenient size and of square, circular, or other shape suitable for being placed, fixed, or supported in stacks one above the other in any desired number, and which vessels are so constructed that the exterior bottom of each may either be roughened chemically, electro-chemically, or mechanically, or may have in itself cavities, receptacles, cells, grooves, or interstices, or have cast upon, attached to, or fixed against it projections or projecting plates, pieces, supports, or frames of lead, which may also be roughened, perforated, interstitial, cellular, grooved, indented, woven, or of such form or forms that suitable active material or materials to be rendered active—such, for instance, as spongy lead or oxides or admixtures of lead—may be formed upon it, or be held in place, or be attached to, or be packed in, on, or against it or them, such surface, surfaces, or projections to be used as one electrode—preferably as the negative-pole plate of a couple—and when fixed in place being immersed in or dipping into the electrolyte contained in the under vessel upon which it stands (insulated) or over which it is supported, the interior of such under vessel having formed upon it or packed or placed in it a layer of suitable active material, which may be in a mass or in divisions, interstices, grooves, or cells, and forming the other electrode, preferably the peroxide or positive-pole plate. The vessels thus constructed—viz., each with interior and exterior active surfaces—are superimposed one upon or over the other, filled to the required height by a suitable electrolyte, and thus they form a series of secondary-battery cells occupying little space and very suitable for employment as regulators or to guard against the inconvenience of stoppages or breakdowns in machinery, as for the usual purposes served by electrical accumulators.

It will be understood that each vessel, as in the case of the cone form of battery described and illustrated by me in the specification of my British patent, No. 5,069, of 1883, thus forms the positive electrode of one pair and the negative electrode of the adjacent pair, or vice versa, and at the same time contains the electrolyte, dispensing with the use of glass or other containers, and thus a great saving in cost is effected, and short-circuiting and the destruction of the peroxide plate by disintegration of the active material through overcharging can be entirely guarded against. The evaporation of the electrolyte is also reduced to a minimum, and no splashing over of spray need take place, as the vessels can be practically closed by suitable construction and superposition one above the other. Leakage of electricity through the spreading or aggregation of moisture over the edges from any cause—such as capillary attraction or atmospheric condensation—may be guarded against by the surrounding trough herein shown or by the means described in my above-referred-to specification. It is evident that by a simple arrangement in connection with the said trough or gutter the level of the electrolyte in each tray may, if desired, be regulated and maintained constant. Such trays, tanks, or vessels may obviously be made of very large size if required, and are practically proof against injury by such misusage as may affect cells of ordinary construction, such as overcharging or discharging or being left in an uncharged condition for any long period.

In preparing the active material for my negative pole plate I sometimes admix with the lead ingredients carbon or pumice-stone, and for my positive-pole plates I sometimes add, with or without either of such materials, an oxide of manganese.

I will now describe, with reference to the accompanying drawings, a suitable form of construction for carrying my invention into effect.

Figure 2:
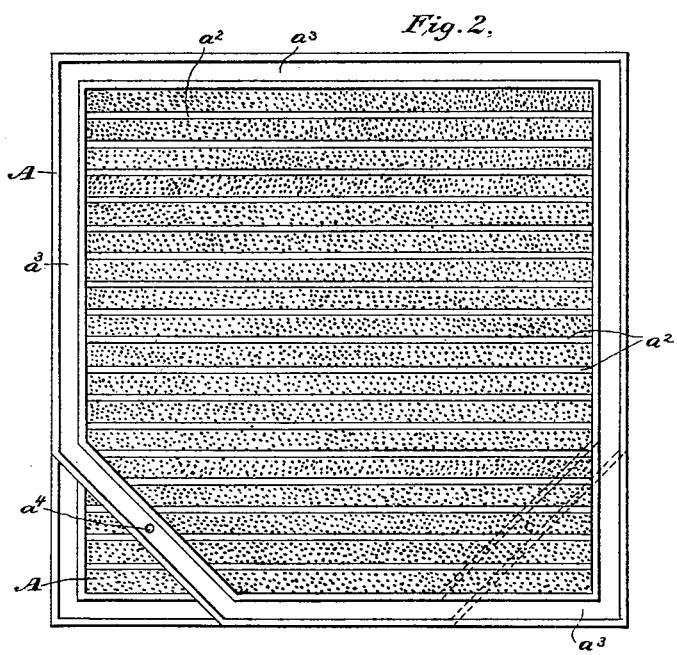

Figure 1 is a vertical section of a battery arranged according to my invention. Fig. 2 is a plan of two trays. Fig. 3 is a perspective view of one of the trays A.

Figure 4:
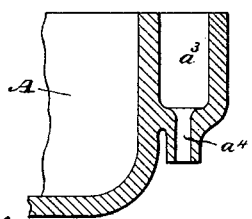

A are trays, (or the like,) of lead, mounted one above the other by being supported upon projections $b$ on framing or supports B. The said trays A have on their under surface depending perforated ribs $a$, and on their upper surface they have slight ribs $a^2$. The active material or material to be rendered active is supported, held, or carried by the perforated ribs $a$, forming the negative-pole plate, and active material is placed or packed in the trays A, so as to form the positive-pole plates. The electrolyte is put into the trays, and when they are placed one over the other the ribs $a$, holding the spongy metallic lead, enter the electrolyte and approach closely to the peroxide layer at bottom of the next tray. Any moisture which may creep over the edges of the trays is received in the channel $a^3$ therearound and runs out by an outlet-pipe, $a^4$, (see the enlarged detail, Fig. 4,) into the tray next beneath it. For this purpose, as also for convenience in filling up with liquid and for observation, the trays have one corner or angle removed, (see Fig. 2,) the trays being so arranged that the outlet-pipes are situated alternately at different sides of the stack. The top and bottom trays of each stack to which the connections are made may of course be of single construction as negative and positive pole plates respectively.

A very convenient form of projecting rib, in lieu of the straight ribs $a\ a$, is shown in Fig. 5, consisting of a series of V-shaped attachments, $a$, which may be readily made by sharply corrugating or bending a perforated plate and attaching it to the bottom of the tray. In such a form the active material may be packed not only in the perforations, but partially in the troughs so formed, and similarly in trays or tanks of sufficiently large dimensions. The layer of active material on the inside bottom of each vessel may be, as it were, hillocked up in alternating ridges and be held in position by means of perforated sheets bent or corrugated into suitable form.

I have illustrated what I consider a very convenient form of my battery; but I do not limit myself to the precise details, as they may, it will be evident, be considerably varied without departing from the nature of my invention as herein stated before the description of the drawings.

Having now described and particularly ascertained the nature of my said invention, and in what manner the same is to be performed, I declare that what I claim is—

1. The combination, in a secondary battery, of a frame or support having shelves or projections arranged one above the other, and two or more elements in the form of a dish or tray adapted to hold the electrolyte, independently supported upon the said shelves or projections.

2. The combination, in a secondary battery, of two or more elements in the form of a tray or vessel adapted to contain the electrolyte, arranged one above the other and furnished with connecting-passages, whereby the overflow from one is conducted to another.

3. In a secondary battery, a couple in the form of a tray or vessel adapted to contain the active material of one element and the electrolyte and furnished with ribs or projections upon its under side, having holes or perforations in which the active material of the other element is placed.

4. In a secondary battery, a couple in the form of a tray or vessel adapted to contain the active material of one element and an electrolyte, and having perforated ribs or projections upon its under side, forming a support for the active material of the other element.

5. In a secondary battery, an element in the form of a tray or vessel adapted to contain the electrolyte, combined with a groove or gutter surrounding the element to catch the overflow.

6. In a secondary battery, an element in the form of a tray or vessel adapted to hold the electrolyte and having ribs or projections containing holes or perforations in which the active material is placed.

7. In a secondary battery, the combination of a series of couples, each in the form of a tray or vessel adapted to contain the active material of one element and an electrolyte and furnished with ribs or projections upon its under side, having holes or perforations in which the active material of the other element is placed, said couples being located one above the other, the perforated ribs of one element being immersed in the electrolyte of the adjacent element.

8. In a secondary battery, the combination of an element consisting of a support to which is applied an active material containing an oxide of lead and an element consisting of a support to which is applied an active material containing an oxide of manganese.

9. In a secondary battery, the combination of an element consisting of a support to which is applied an active material consisting of an oxide of lead mixed with a porous inert material and an element consisting of a support to which is applied an active material consisting of an oxide of manganese mixed with a porous inert material.

In testimony whereof I have signed my name to this specification in the presence of two subscribing witnesses.

JOHN S. SELLON.

Witnesses:
JOHN NEWTON,
WM. JOHN WEEKS,
   *Both of 9 Birchin Lane, London.*